J. D. SARVEN.

Buggy Spring.

No. 74,009.

Patented Feb. 4, 1868.

Witnesses:
Theo Tuscke
J. A. Service.

Inventor:
Jas. D. Sarven
Per Munn &
Attorneys

United States Patent Office.

JAMES D. SARVEN, OF COLUMBIA, TENNESSEE.

Letters Patent No. 74,009, dated February 4, 1868.

IMPROVEMENT IN CARRIAGE-SPRINGS.

*The Schedule referred to in these Letters Patent and making part of the same.*

TO ALL WHOM IT MAY CONCERN:

Be it known that I, JAMES D. SARVEN, of Columbia, in the county of Maury, and State of Tennessee, have invented a new and useful Improvement in Buggy and other Springs; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to so improve the construction of buggy and other springs that they may have the requisite elasticity to ride easy, whether carrying a heavy or light weight; and it consists in the combination of the curved plates, having ears or flanges formed upon their side edges, the rubber springs, and the curved steel springs, with each other, with the body of the vehicle, and with the ordinary springs, the whole being constructed as hereinafter more fully described.

Figure 1:
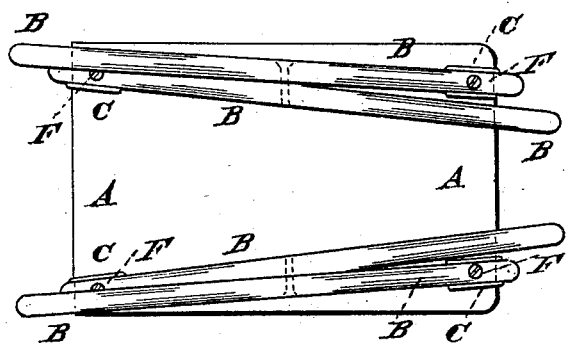
Figure 1 is a bottom view of the body of a buggy to which my improvement has been attached.
Figure 2:
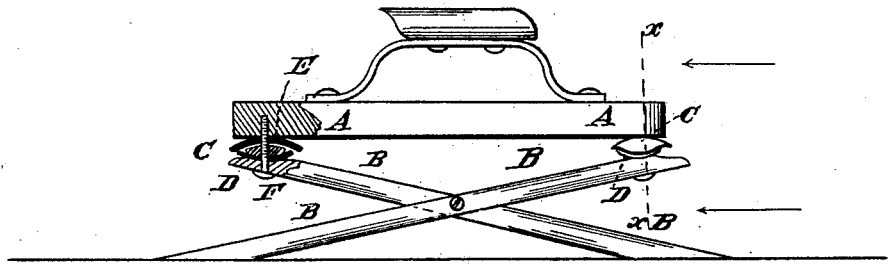
Figure 2 is a side view of the same, part being broken away to show the construction.
Figure 3:
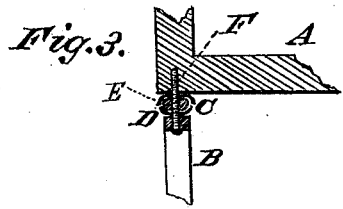
Figure 3 is a detail sectional view, taken through the line $x\,x$, fig. 2.

A represents the body of a buggy. B are the ordinary wooden springs, the middle parts of each pair of which are pivoted to each other, and their lower ends are attached to the bolsters or running part of the buggy. C is a curved plate, the side edges of which are turned down so as to form flanges or ears, as shown in figs. 2 and 3, and which are attached to the body A at the points where the upper ends of the springs B are connected to the said body. D are curved steel springs, resting upon the upper ends of the springs B in such a position that their ends may rest against the under or concave surface of the plates C, as shown in fig. 2. E are rubber springs placed in the cavity between the plates C and springs D, as shown in figs. 2 and 3. F are the screws or bolts by which the upper ends of the springs B are connected and secured to the body A, and which also pass through the plates C, rubber springs E, and springs D, the holes through the springs D being so large that the said springs may work loosely upon the said bolts.

By this construction and arrangement, when the weight carried in the vehicle is so light as not to operate the springs B, the steel springs D and rubber springs E will furnish the requisite elasticity to make the vehicle ride easy; and when the weight carried is heavier, the springs D will be pressed up against the plates C, compressing the rubber springs E within the contracted cavity between the plates C and springs D, diminishing their elasticity, and allowing the weight to act upon the springs B, thus securing sufficient elasticity both when a heavy and when a light weight is carried.

I claim as new, and desire to secure by Letters Patent—

The combination of the steel springs D, rubber springs E, and curved plates C, (having flanges or ears formed upon their side edges,) with each other, and with the springs and body of the vehicle, substantially as herein shown and described, and for the purpose set forth.

JAMES D. SARVEN.

Witnesses:
W. S. RAINEY,
JOE H. FUSSELL.